(12) United States Patent
Chen et al.

(10) Patent No.: US 10,983,299 B2
(45) Date of Patent: Apr. 20, 2021

(54) HEAD-MOUNTED DISPLAY APPARATUS

(71) Applicant: Quanta Computer Inc., Taoyuan (TW)

(72) Inventors: Chun-Lung Chen, Taoyuan (TW);
Yuan-Peng Yu, Taoyuan (TW);
Wei-Jen Chang, Taoyuan (TW);
Hung-Chieh Wu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/406,451

(22) Filed: May 8, 2019

(65) Prior Publication Data

US 2020/0209509 A1    Jul. 2, 2020

(30) Foreign Application Priority Data

Dec. 27, 2018   (TW) .................................. 107147518

(51) Int. Cl.
| | | |
|---|---|---|
| *G02B 7/02* | (2021.01) | |
| *A42B 1/24* | (2021.01) | |
| *G02B 25/00* | (2006.01) | |
| *A42B 1/0182* | (2021.01) | |

(52) U.S. Cl.
CPC ............ *G02B 7/023* (2013.01); *A42B 1/0182* (2021.01); *A42B 1/24* (2013.01); *G02B 25/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,282,086 | A * | 1/1994 | Goldstein | ............. A42B 1/247 359/407 |
| 2012/0050144 | A1* | 3/2012 | Morlock | ............... G06T 19/006 345/8 |
| 2017/0139212 | A1* | 5/2017 | Choi | ........................ G06F 3/013 |
| 2017/0255018 | A1* | 9/2017 | Goldstein | ............. A42B 3/042 |
| 2018/0004002 | A1* | 1/2018 | Rong | ................... G02B 27/283 |
| 2019/0258061 | A1* | 8/2019 | Solomon | ............ G02B 27/0176 |

FOREIGN PATENT DOCUMENTS

| | | |
|---|---|---|
| CN | 203986290 U | 12/2014 |
| CN | 204613517 U | 9/2015 |

* cited by examiner

*Primary Examiner* — William Boddie
*Assistant Examiner* — Alecia D English
(74) *Attorney, Agent, or Firm* — Rabin & Berdo, P.C.

(57) ABSTRACT

A head-mounted display apparatus includes a wearing device, a display-source arrangement portion and an optical assembly. The wearing device has a head-wearing portion and a hat brim portion connected to the head-wearing portion. The display-source arrangement portion is connected with the hat brim portion. The optical assembly is movably disposed on the hat brim portion, and arranged between the head-wearing portion and the display-source arrangement portion.

4 Claims, 6 Drawing Sheets

HEAD-MOUNTED DISPLAY APPARATUS

RELATED APPLICATIONS

This application claims priority to Taiwan Application Serial Number 107147518, filed Dec. 27, 2018, which is herein incorporated by reference.

BACKGROUND

Field of Disclosure

The disclosure relates to a head-mounted apparatus. More particularly, the disclosure relates to a head-mounted display apparatus.

Description of Related Art

With the improvement of technology, a head-mounted display apparatus for Augmented Reality (AR) has been gradually popular in the marketplace. The head-mounted display apparatus is used to be worn on a user's head for the user to view the displayed image.

However, if the user feels the displayed image provided by the current head-mounted display apparatus overly small, or close from the displayed image, and cannot adjust to correspondingly align with the user's eyes according to the position of the eyes, the user might feel uncomfortable during viewing thereby reducing the willingness of the user to use the apparatus.

SUMMARY

In one embodiment of the disclosure, a head-mounted display apparatus is provided for solving the problems mentioned in the prior art.

In one embodiment of the disclosure, the head-mounted display apparatus includes a wearing device, a display-source arrangement portion and an optical assembly. The wearing device has a head-wearing portion and a hat brim portion connected to the head-wearing portion. The display-source arrangement portion is connected with the hat brim portion. The optical assembly is movably disposed on the hat brim portion, and arranged between the head-wearing portion and the display-source arrangement portion.

According to one or more embodiments of the disclosure, the head-mounted display apparatus further includes a display screen. The display screen is fixedly disposed in the display-source arrangement portion, optically coupled to the optical assembly for transmitting lights of the display screen to the optical assembly.

According to one or more embodiments of the disclosure, the head-mounted display apparatus further includes a frame body, a separation plate and a transparent area. The frame body is fixedly disposed on a bottom portion of the hat brim portion. The separation plate is obliquely disposed on the frame body so as to form an upper receiving portion and a lower receiving portion in the frame body, and the upper receiving portion is located between the hat brim portion and the separation plate, and the lower receiving portion is capable of receiving the optical assembly. The transparent area penetrates through the separation plate, and is connected to the upper receiving portion and the lower receiving portion, for transmitting the lights of the display screen to the optical assembly.

According to one or more embodiments of the disclosure, in the head-mounted display apparatus, the optical assembly includes a loading frame and a lens. The loading frame is disposed in the lower receiving portion, provided with a pivotal member, and the loading frame being pivotally connected to the frame body through the pivot member. The lens is equipped in the loading frame.

According to one or more embodiments of the disclosure, in the head-mounted display apparatus, a capability of the lower receiving portion is larger than a size of the optical assembly.

According to one or more embodiments of the disclosure, in the head-mounted display apparatus, the optical assembly is slidably connected to the frame body.

According to one or more embodiments of the disclosure, in the head-mounted display apparatus, the optical assembly includes a lens or a filter.

According to one or more embodiments of the disclosure, in the head-mounted display apparatus, the optical assembly includes a lens for image enlargement, or a lens for providing upright virtual images.

According to one or more embodiments of the disclosure, in the head-mounted display apparatus, the display-source arrangement portion includes a replacement cavity for removably receiving an external device.

In one embodiment of the disclosure, the head-mounted display apparatus includes a wearing device, a fixed frame and a display screen. The fixed frame includes a frame body, a separation plate and a transparent area. The frame body is fixedly disposed on the wearing device. The separation plate is obliquely disposed on the frame body so as to form an upper receiving portion and a lower receiving portion in the frame body. The transparent area penetrates through the separation plate, and is connected to the upper receiving portion and the lower receiving portion. The optical assembly is movably disposed within the lower receiving portion. The display screen is disposed within the upper receiving portion, covering the transparent area. One display surface of the display screen is optically coupled to the optical assembly through the transparent area.

With the structure described in the above embodiments, the user can adjust the optical assembly to correspondingly align with the user's eyes according to the position of the user's eyes so that the head-mounted display apparatus can provide suitable images to the user, thus, the user will not feel uncomfortable during viewing thereby increasing the willingness of the user to use the apparatus.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
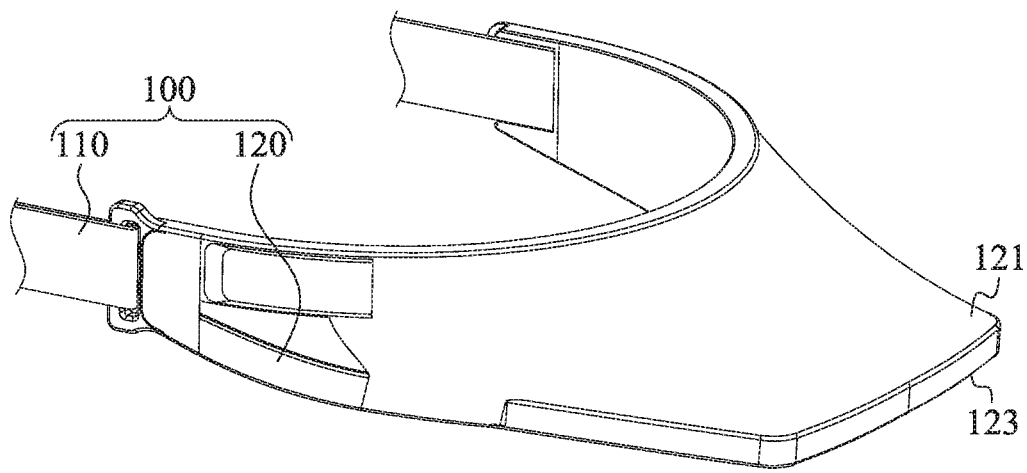
FIG. 1 is an exploded view of a head-mounted display apparatus according to one embodiment of the disclosure.
Figure 1:
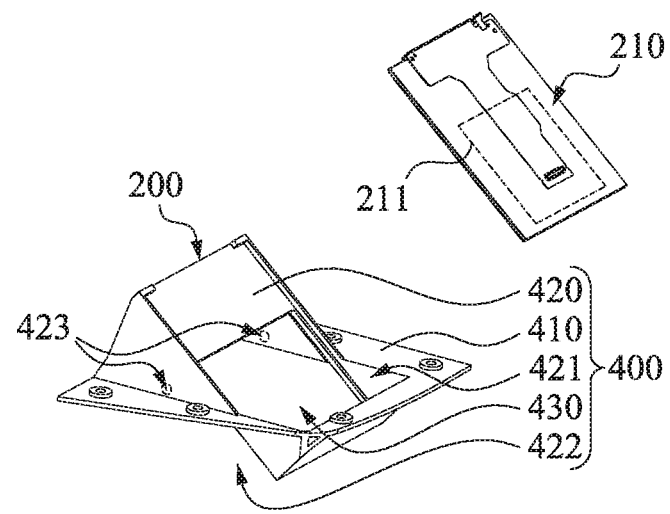
Figure 1:
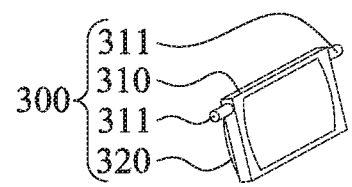

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2:
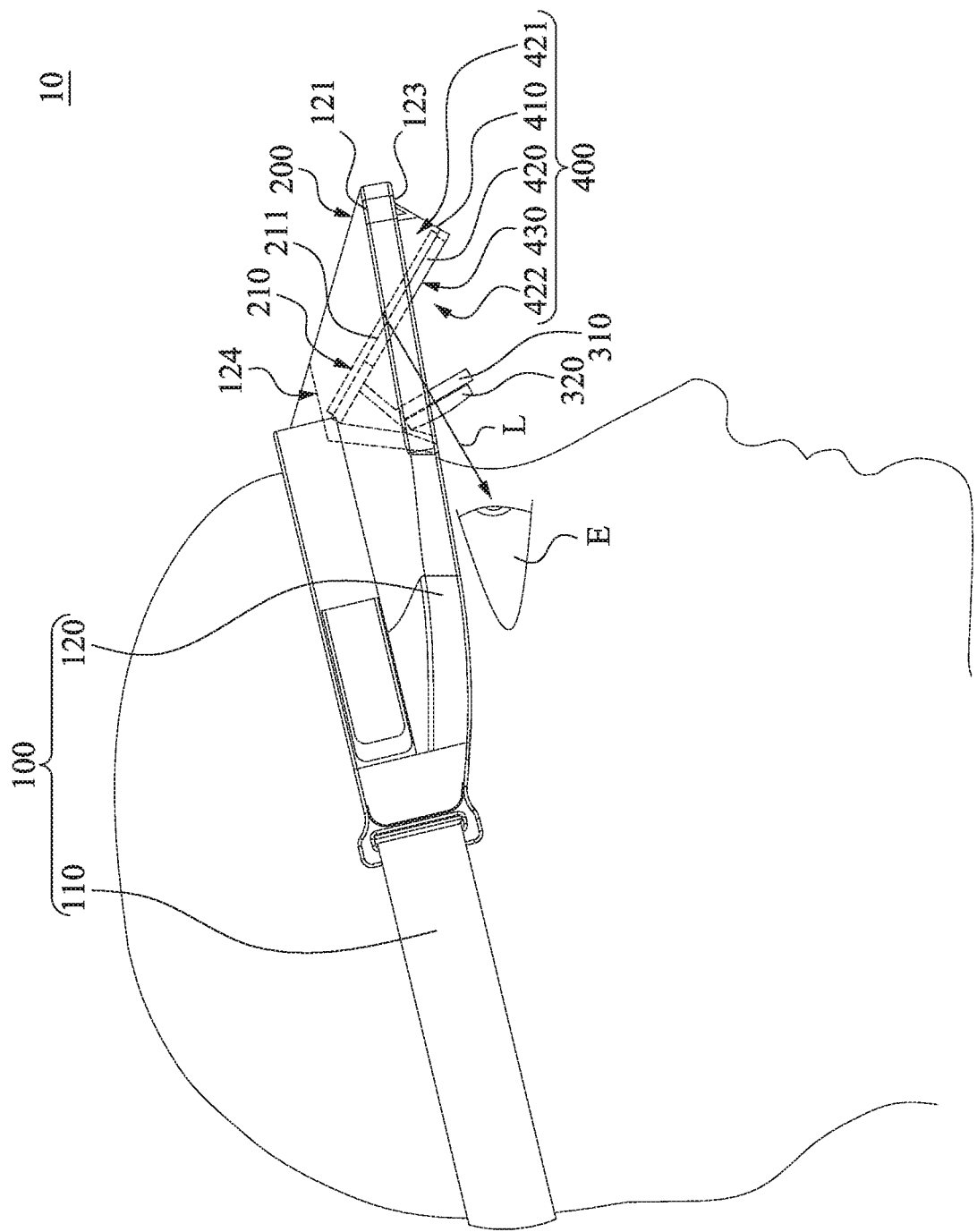
FIG. 2 is a schematic view of the head-mounted display apparatus of FIG. 1 being worn on a user of FIG. 1.

Reference is now made to FIG. 1 to FIG. 2, in which FIG. 1 is an exploded view of a head-mounted display apparatus 10 according to one embodiment of the disclosure, and FIG. 2 is a schematic view of the head-mounted display apparatus 10 of FIG. 1 being worn on a user of FIG. 1. As shown in FIG. 1 to FIG. 2, the head-mounted display apparatus 10 includes a wearing apparatus 100, a display-source arrangement portion 200, a display screen 210 and an optical assembly 300. The wearing apparatus 100 is provided with a head-wearing portion 110 and a hat brim portion 120 connected to the head-wearing portion 110. The optical assembly 300 is movably disposed on the hat brim portion 120, and arranged between the head-wearing portion 110 and the display-source arrangement portion 200. The display screen 210 is fixedly disposed in the display-source arrangement portion 200, and is optically coupled to the optical assembly 300. Thus, lights L from the display surface 211 of the display screen 210 can be transmitted to the optical assembly 300 so that the optical assembly 300 can guide the lights L of the optical assembly 300 into the user's eye E. In other words, the display surface 211 of the display screen 210 can provide display images to the user's eye E through the optical assembly 300.

Therefore, with the structure described in the above embodiment, the user can adjust the optical assembly 300 to correspondingly align with the user's eye according to the position of the user's eye E so that the head-mounted display apparatus can provide images to the user, thus, the user will not feel uncomfortable during viewing, thereby increasing the willingness of the user to use the apparatus.

In this embodiment, the wearing apparatus 100 is used to be worn on a user's head. For example, the wearing apparatus 100 can be a visor cap that reveals the top of the user's head. However, the disclosure is not limited thereto. In other embodiments, the wearing device may be a baseball cap that hides the top of the user's head. Specifically, in the embodiment, the head-wearing portion 110, for example, is a strip body. The hat brim portion 120 includes a top portion 121 and a bottom portion 123 which are opposite to each other. The display screen 210 and the optical assembly 300 are commonly disposed on the bottom portion 123 of the hat brim portion 120.

The display screen 210 is equipped in the head-mounted display apparatus 10, and connected to an external computer (not shown in figures) via cables so as to be controlled by the external computer. Thus, the display surface 211 of the display screen 210 can provide images to the user's eye E through the optical assembly 300. The display screen 210 is, for example, a non-transmissive type display.

Furthermore, the head-mounted display apparatus 10 further includes a fixed frame 400. The fixed frame 400 is disposed on the bottom portion 123 of the hat brim portion 120. In the embodiment, the hat brim portion 120 is formed with an inner space 124. One part of the fixed frame 400 is received within the inner space 124, and other part of the fixed frame 400 extends outwards from the bottom portion 123 of the hat brim portion 120. For example, the fixed frame 400 includes a frame body 410, a separation plate 420 and a transparent area 430. The frame body 410 is fixedly disposed on a bottom portion 123 of the hat brim portion 120. The separation plate 420 is obliquely disposed on the frame body 410 so as to form an upper receiving portion 421 and a lower receiving portion 422 in the frame body 410, and the upper receiving portion 421 is located between the hat brim portion 120 and the separation plate 420. The display screen 210 is located in the upper receiving portion 421, disposed on the separation plate 420, and the display surface 211 of the display screen 210 exactly faces towards the transparent area 430. The lower receiving portion 422 is capable of receiving the optical assembly 300. The transparent area 430 is, for example, a through hole that penetrates through the separation plate 420, or a transparent acrylic sheet without through hole, connected to the upper receiving portion 421 and the lower receiving portion 422 for transmitting lights L of display surface 211 of the display screen 210 to the optical assembly 300 via the transparent area 430.

Also, the optical assembly 300 includes a loading frame 310 and a lens 320. The lens 320 is equipped in the loading frame 310. The loading frame 310 is disposed in the lower receiving portion 422, and is provided with a pivotal member 311 at the outer side of the loading frame 310. The frame body 410 of the fixed frame 400 is formed with a shaft-received hole 423 at an inner side of the frame body 410. The loading frame 310 is pivotally connected to the shaft-received hole 423 through the pivot member 311. Thus, the optical assembly 300 is rotatable relative to the fixed frame 400.

By rotating the optical assembly 300, the lens 320 of the optical assembly 300 can be adjusted at an angle relative to the user's eye E thereby properly directing the light L to the user's eye E.

In one embodiment, the lens 320 is, for example, a lens (e.g., a magnifying glass) for image enlargement, that is, the lens 320 can assist to provide magnifying images of the display screen 210 to the user's eye E. However, the disclosure is not limited thereto. In other embodiments, the lens 320 can also be a lens for providing upright virtual images, such as a convex lens, or the optical assembly can also be an optical assembly including a filter or other suitable one.

Figure 3:
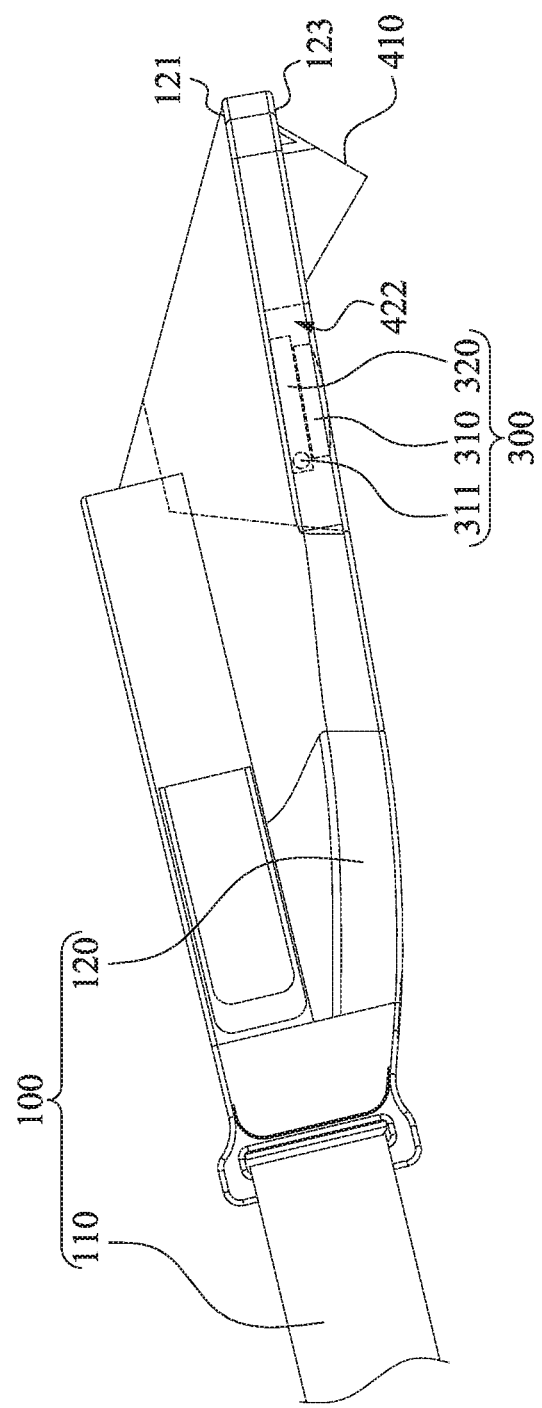
FIG. 3 is a schematic operational view of an optical assembly of FIG. 2 being closed according to one embodiment of the disclosure.

FIG. 3 is a schematic operational view of an optical assembly 300 of FIG. 2 being closed according to one embodiment of the disclosure. As shown in FIG. 1 and FIG. 3, in a specific embodiment, a capability of the lower receiving portion 422 is larger than a size of the optical assembly 300, so that the optical assembly 300 is able to be completely moved into the lower receiving portion 422 when a user rotates the loading frame 310 into the lower receiving portion 422. However, the disclosure is not limited thereto. In other embodiments, the optical assembly 300 is not necessarily needed to be completely received in the lower receiving portion 422.

Figure 4:
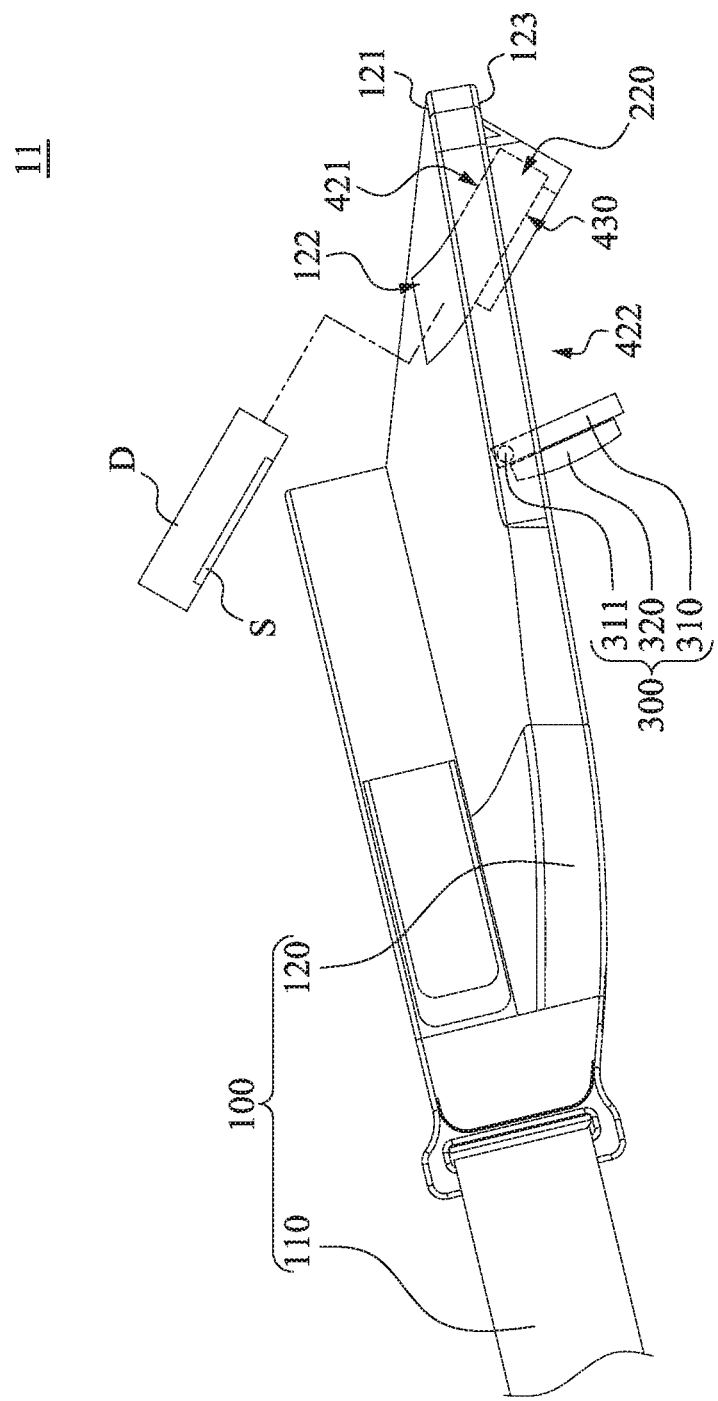
FIG. 4 is a schematic operational view of a head-mounted display apparatus according to one embodiment of the disclosure.

FIG. 4 is a schematic operational view of a head-mounted display apparatus 11 according to one embodiment of the disclosure. As shown FIG. 4, the head-mounted display apparatus 11 of the embodiment is substantially the same to the head-mounted display apparatus 10 of FIG. 1. However, at least one difference of the head-mounted display apparatus 11 of FIG. 4 from the head-mounted display apparatus 10 of FIG. 1 is that, the display screen 210 of the head-mounted display apparatus 10 of FIG. 1 cannot be unplugged outwards from the head mounted display apparatus 10. In contrast, as shown in FIG. 4, the display-source arrangement portion 200 of the head mounted display apparatus 11 of FIG. 4 is free with any display screen built in, but is with a replacement cavity 220 for removably receiving an external device D. The external device D is, for example, a smart phone. The top portion 121 of the hat brim portion 120 is formed with an opening 122. The opening 122 is connected to the upper receiving portion 421.

When the user prepares an external device D and slides the external device D into the upper receiving portion 421 through the opening 122, such that the screen S of the external device D exactly faces towards the optical assembly 300 in the lower receiving portion 422 through the transparent area 430. Thus, the images of the screen S of the external device D can be guided to the user's eye E through the optical assembly 300.

Figure 5A:
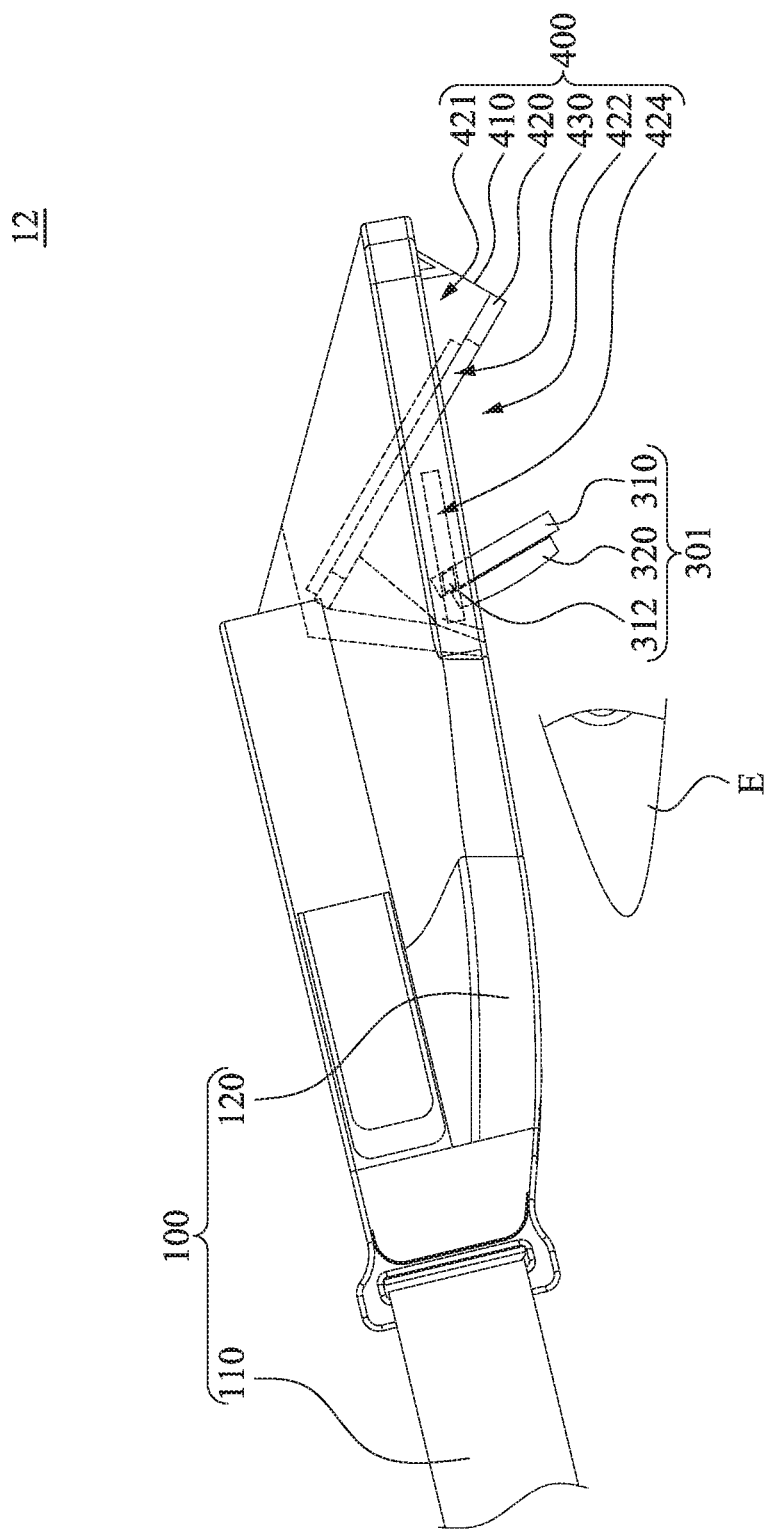
FIG. 5A and FIG. 5B respectively are schematic operational views of the head-mounted display apparatus according to one embodiment of the disclosure.
Figure 5B:
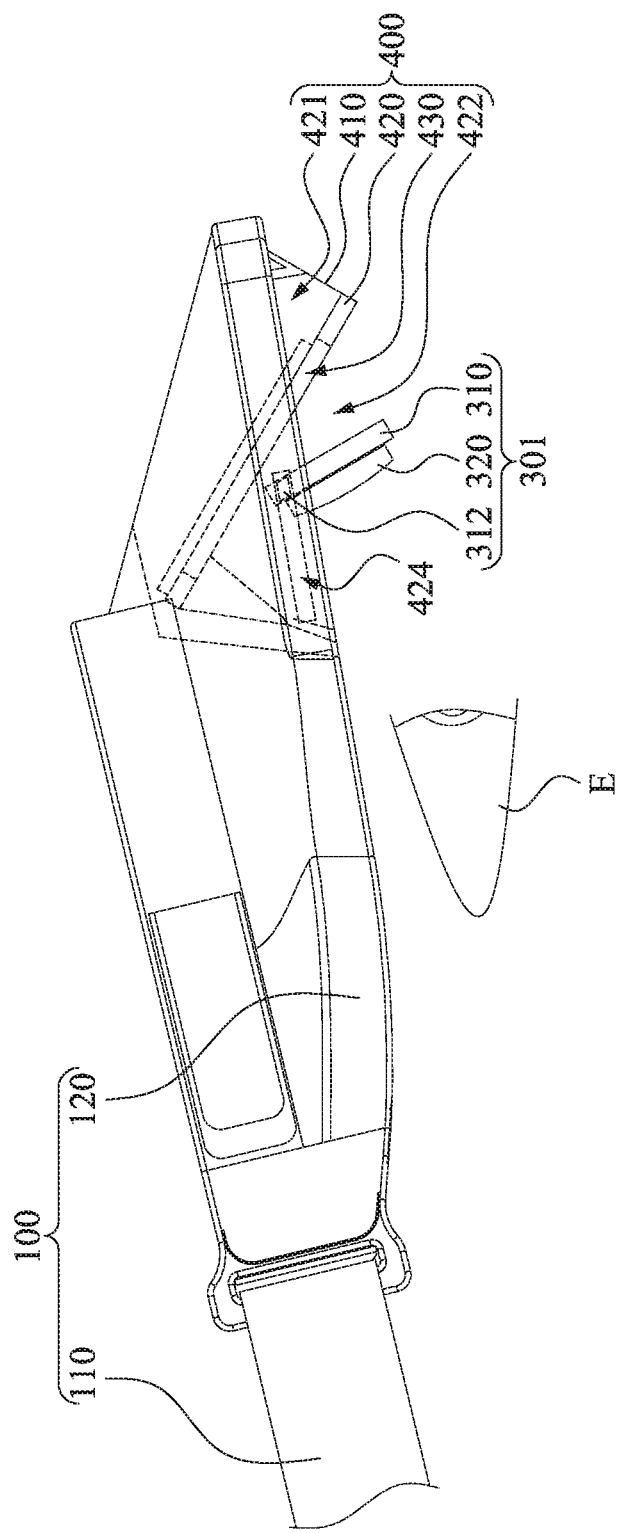

FIG. 5A and FIG. 5B respectively are schematic operational views of the head-mounted display apparatus 12 according to one embodiment of the disclosure. As shown in FIG. 5A, the head-mounted display apparatus 12 of the embodiment is substantially the same to the head-mounted display apparatus 10 of FIG. 1. However, at least one difference of the head-mounted display apparatus 12 of FIG. 5A from the head-mounted display apparatus 10 of FIG. 1 is that, the optical assembly 301 of the head-mounted display apparatus 12 is slidably connected to the frame body 410 of the fixed frame 400. The optical assembly 301 can be horizontally displaced on the frame body 410 of the fixed frame 400.

For example, the optical assembly 301 includes a loading frame 310 and a lens 320. The lens 320 is equipped in the loading frame 310. The loading frame 310 is disposed in the lower receiving portion 422, and is provided with a sliding block 312 at the outer side of the loading frame 310. The frame body 410 of the fixed frame 400 is formed with a sliding slot 424 at an inner side of the frame body 410. The loading frame 310 can be slidably engaged with the sliding slot 424 of the frame body 410 through the sliding block 312. Thus, the optical assembly 301 is slidable relative to the fixed frame 400. Therefore, by sliding the optical assembly 301 horizontally, the user can correspondingly adjust the gap distance between the optical assembly 301 and the user's eye E.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A head-mounted display apparatus, comprising:
   a wearing device having a head-wearing portion and a hat brim portion having an inner space;
   a frame body fixedly disposed on a bottom portion of the hat brim portion;
   a display-source arrangement portion connected with the hat brim portion;
   an optical assembly movably disposed on the hat brim portion, and arranged between the head-wearing portion and the display-source arrangement portion, wherein the optical assembly comprising a loading frame and a lens, the lens being equipped in the loading frame, the loading frame being provided with a pivotal member, and being pivotally connected to the frame body through the pivot member;
   a separation plate obliquely disposed on the frame body so as to form an upper receiving portion and a lower receiving portion in the frame body, wherein
      the separation plate has an upper protruding portion and a lower protruding portion,
      the upper protruding portion is connected to the frame body and located in the inner space of the hat brim portion,
      the lower protruding portion is connected to the frame body and located under the frame body,
      the upper receiving portion is formed inside the upper protruding portion and located between the hat brim portion and the separation plate, and
      the lower receiving portion is formed inside the upper protruding portion, and capable of receiving the optical assembly; and
   a transparent plate or opening in the separation plate, for connecting the upper receiving portion and the lower receiving portion.

2. The head-mounted display apparatus of claim 1, further comprising:
   a display screen fixedly disposed in the display-source arrangement portion, optically coupled to the optical assembly for transmitting lights of the display screen to the optical assembly through the transparent plate or opening.

3. The head-mounted display apparatus of claim 1, wherein a capability of the lower receiving portion is larger than a size of the optical assembly.

4. The head-mounted display apparatus of claim 1, wherein the lens is used for image enlargement, or for providing upright virtual images.

* * * * *